United States Patent
Shimura

(10) Patent No.: US 9,821,568 B2
(45) Date of Patent: Nov. 21, 2017

(54) NONAQUEOUS INKJET PRINTING METHOD

(71) Applicant: RISO KAGAKU CORPORATION, Tokyo (JP)

(72) Inventor: Shinichiro Shimura, Ibaraki (JP)

(73) Assignee: RISO KAGAKU CORPORATION, Tokyo (JP)

(*) Notice: Subject to any disclaimer, the term of this patent is extended or adjusted under 35 U.S.C. 154(b) by 0 days.

(21) Appl. No.: 15/174,296

(22) Filed: Jun. 6, 2016

(65) Prior Publication Data
US 2016/0375697 A1 Dec. 29, 2016

(30) Foreign Application Priority Data
Jun. 26, 2015 (JP) ................. 2015-129336

(51) Int. Cl.
*B41J 2/21* (2006.01)
*B41M 5/00* (2006.01)
(Continued)

(52) U.S. Cl.
CPC .......... *B41J 2/2107* (2013.01); *B41M 5/0011* (2013.01); *B41M 5/0023* (2013.01);
(Continued)

(58) Field of Classification Search
CPC .. B41J 2/2107; B41M 5/0011; B41M 5/0023; B41M 7/0018; B41M 5/0017;
(Continued)

(56) References Cited

U.S. PATENT DOCUMENTS

| 8,507,585 B2 | 8/2013 | Hosoya et al. |
| 2011/0046298 A1 | 2/2011 | Hosoya et al. |

(Continued)

FOREIGN PATENT DOCUMENTS

| EP | 0887391 | 12/1998 |
| JP | 2010-001452 | 1/2010 |

(Continued)

OTHER PUBLICATIONS

Search Report issued in European Patent Office (EPO) Patent Application No. 16173765.5, dated Jan. 18, 2017.

*Primary Examiner* — Alessandro Amari
*Assistant Examiner* — Roger W Pisha, II
(74) *Attorney, Agent, or Firm* — Greenblum & Bernstein, P.L.C.

(57) ABSTRACT

A nonaqueous inkjet printing method that can provide prints with both high printing density and good gradation is provided. The nonaqueous inkjet printing method comprises printing an image by an inkjet recording system using a first nonaqueous ink comprising at least a coloring pigment, a water-soluble resin having an amino group, and a nonaqueous solvent, and then printing an image so as to overlap with the preceding image by an inkjet recording system using a second nonaqueous ink, wherein the second nonaqueous ink comprises at least a coloring pigment, inorganic particles, and a nonaqueous solvent, and the content of the coloring pigment in the second nonaqueous ink is lower than the content of the coloring pigment in the first nonaqueous ink. The first nonaqueous ink is preferably printed at a higher resolution of printing than the second nonaqueous ink.

15 Claims, 4 Drawing Sheets

(51) Int. Cl.
    *C09D 11/322*    (2014.01)
    *C09D 11/324*    (2014.01)
    *C09D 11/36*     (2014.01)
    *C09D 11/38*     (2014.01)
    *B41M 3/00*      (2006.01)
    *B41M 7/00*      (2006.01)

(52) U.S. Cl.
    CPC .......... *C09D 11/322* (2013.01); *C09D 11/324* (2013.01); *C09D 11/36* (2013.01); *C09D 11/38* (2013.01); *B41M 3/008* (2013.01); *B41M 5/0017* (2013.01); *B41M 7/0018* (2013.01)

(58) Field of Classification Search
    CPC .... B41M 3/008; C09D 11/322; C09D 11/324; C09D 11/36; C09D 11/38
    See application file for complete search history.

(56) References Cited

U.S. PATENT DOCUMENTS

| | | | |
|---|---|---|---|
| 2011/0148980 A1 | 6/2011 | Arai et al. | |
| 2014/0292962 A1* | 10/2014 | Nakano | B41J 2/175 |
| | | | 347/89 |
| 2015/0174939 A1 | 6/2015 | Aoyama et al. | |
| 2015/0184011 A1 | 7/2015 | Shimura et al. | |
| 2015/0184012 A1 | 7/2015 | Endo et al. | |

FOREIGN PATENT DOCUMENTS

| | | |
|---|---|---|
| JP | 2012-131075 | 7/2012 |
| JP | 2012-161981 | 8/2012 |
| JP | 2014-015492 | 1/2014 |

\* cited by examiner (a)

(b)

(c)

(d)

(e)

(f)

NONAQUEOUS INKJET PRINTING METHOD

TECHNICAL FIELD

The present invention relates to a nonaqueous inkjet printing method in which an image is printed by an inkjet recording system using a nonaqueous pigment ink, and then an image is printed so as to overlap with the preceding image by an inkjet recording system using a nonaqueous ink containing a coloring pigment such as carbon black and inorganic particles such as silica to achieve both high printing density and good gradation.

BACKGROUND ART

The inkjet recording system is a system in which an inkjet ink having high fluidity is ejected from fine head nozzles as ink particles to record an image on a printing paper placed opposed to the above nozzles, thereby making high speed printing possible with low noise, and therefore has become popular rapidly in recent years. As an ink used in such an inkjet recording system, various so-called nonaqueous pigment inks in which pigments are dispersed in nonaqueous solvents are proposed.

Compared with aqueous pigment inks, the nonaqueous pigment inks as described above are excellent in water resistance as well as in ejection stability, particularly continuous ejection properties and in decreasing image stains due to mist, however, are still problematic in that the pigment easily permeates into the inside of paper, thereby decreasing printing density. Therefore, in order to increase printing density, for example, a nonaqueous pigment ink in which nonaqueous resinous dispersion particles capable of dispersing pigments in a nonaqueous solvent are blended (Patent Document 1), and a nonaqueous pigment ink in which a water-soluble resin containing two or more amino groups in one molecule is added (Patent Document 2) are proposed.

CONVENTIONAL TECHNICAL LITERATURES

Patent Documents

Patent Document 1 JP-A-2010-1452
Patent Document 2 JP-A-2014-15492
Patent Document 3 JP-A-2012-131075
Patent Document 4 JP-A-2012-161981

SUMMARY OF INVENTION

Problems to be Solved by the Invention

Even though the above conventional nonaqueous pigment inks improve printing density, they are often deteriorated in other properties such as storage stability and ejection stability.

Therefore, studies have been made to increase printing density by devising printing methods. For example, an inkjet printing method in which a pre-treatment liquid containing inorganic particles is applied to a printing medium, and then a nonaqueous pigment ink is ejected to the printing medium to perform printing (Patent Document 3), and a method of inkjet-printing a printing medium with a nonaqueous pigment ink, and treating at least the printed surface with an aftertreatment agent containing inorganic particles and water (Patent Document 4) are proposed. However, these printing methods have a problem of impairing gradation particularly at a resolution of 600×600 dpi or more.

It is an object of the present invention to provide a printing method using a nonaqueous pigment ink as described above that can provide prints with both high printing density and good gradation.

Disclosure of Invention

The present inventor has studied diligently for the above object and as a result found that prints having both high printing density and good gradation are obtained by a nonaqueous inkjet printing method in which an image is printed by an inkjet recording system using a nonaqueous pigment ink, and then an image is printed so as to overlap with the preceding image by an inkjet recording system using an aftertreatment liquid, in which a first nonaqueous ink comprising a coloring pigment and a water-soluble resin having an amino group is used as the above nonaqueous pigment ink, and a second nonaqueous ink containing inorganic particles such as silica together with a low concentration of a coloring pigment is used as the above aftertreatment liquid, thereby leading to the completion of the present invention.

That is, the present invention provides a nonaqueous inkjet printing method comprising printing an image by an inkjet recording system using a first nonaqueous ink comprising at least a coloring pigment, a water-soluble resin having an amino group, and a nonaqueous solvent, and then printing an image so as to overlap with the preceding image by an inkjet recording system using a second nonaqueous ink, wherein the second nonaqueous ink comprises at least a coloring pigment, inorganic particles, and a nonaqueous solvent, and the content of the coloring pigment in the second nonaqueous ink is lower than the content of the coloring pigment in the first nonaqueous ink.

Effect of the Invention

According to the present invention, a first nonaqueous ink containing a water-soluble resin having an amino group is used as a nonaqueous pigment ink, and a second nonaqueous ink containing inorganic particles such as silica together with a low concentration of a coloring pigment is used as an aftertreatment liquid. Therefore, even in an image region where the density of the nonaqueous pigment ink is low, an image with little bleeding and clear sharpness can be formed, and particularly, even when printing is performed by an inkjet printing system with a resolution of 600×600 dpi or more, prints having both high printing density and gradation are obtained.

DETAILED DESCRIPTION OF EMBODIMENTS

Figure 1:
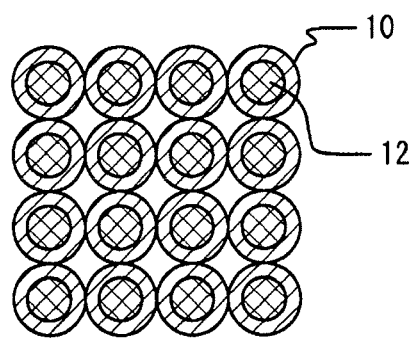
FIG. 1 is a plan view schematically showing a state in which droplets of a second nonaqueous ink land on dots of a first nonaqueous ink.

The present invention will be described in more detail below.
1. First Nonaqueous Ink
The first nonaqueous ink used in the present invention is one used as a nonaqueous pigment ink, which comprises at least a coloring pigment, a water-soluble resin having an amino group, and a nonaqueous solvent, and may contain other components such as a pigment-dispersing agent and a water-insoluble resin as needed.
1-1. Coloring Pigment
As the pigment contained in the first nonaqueous ink, coloring pigments are used, and specifically, organic pigments such as azo pigments, phthalocyanine pigments, polycyclic pigments, and dyeing lake pigments, and inorganic pigments can be used. Examples of the azo pigments include soluble azo lake pigments, insoluble azo pigments, and condensed azo pigments. Examples of the phthalocyanine pigments include metal phthalocyanine pigments and metal-free phthalocyanine pigments. Examples of the polycyclic pigments include quinacridone pigments, perylene pigments, perinone pigments, isoindoline pigments, isoindolinone pigments, dioxazine pigments, thioindigo pigments, anthraquinone pigments, quinophthalone pigments, metal complex pigments, and diketopyrrolopyrrole (DPP). Typical examples of the inorganic pigments include carbon black and titanium oxide. Specific examples of the carbon black include furnace carbon black, lampblack, acetylene black, and channel black. These pigments may be used alone, or two or more of these pigments may be used in combination.

The content of the coloring pigment in the first nonaqueous ink is usually 0.5 to 20% by mass based on 100% by mass of the total amount of the ink, and is preferably 2 to 15% by mass, still more preferably 5 to 10% by mass, from the viewpoint of printing density and gradation.

The average particle diameter of the coloring pigment in the first nonaqueous ink is preferably 500 nm or less, more preferably 150 nm or less, from the viewpoint of ejection stability and storage stability. Here, the average particle diameter of the pigment is a volume-based value measured by a dynamic light scattering type particle size distribution measuring apparatus LB-500 manufactured by HORIBA, Ltd.

1-2. Nonaqueous Solvent

The nonaqueous solvent should be one that can constitute a vehicle of the first nonaqueous ink, and nonpolar organic solvents and polar organic solvents can be used. These may be used alone and can also be used in combination. In the present invention, as the nonaqueous solvent, a water-insoluble organic solvent that does not mix uniformly with the same volume of water at 1 atmosphere and 20° C. is preferably used.

Preferred examples of the nonpolar organic solvents can include petroleum hydrocarbon solvents such as aliphatic hydrocarbon solvents, alicyclic hydrocarbon solvents, and aromatic hydrocarbon solvents. Examples of the aliphatic hydrocarbon solvents and the alicyclic hydrocarbon solvents can include paraffin, isoparaffin, and naphthene nonaqueous solvents. Preferred examples of commercial products can include No. 0 SOLVENT L, No. 0 SOLVENT M, No. 0 SOLVENT H, CACTUS NORMAL PARAFFIN N-10, CACTUS NORMAL PARAFFIN N-11, CACTUS NORMAL PARAFFIN N-12, CACTUS NORMAL PARAFFIN N-13, CACTUS NORMAL PARAFFIN N-14, CACTUS NORMAL PARAFFIN N-15H, CACTUS NORMAL PARAFFIN YHNP, CACTUS NORMAL PARAFFIN SHNP, ISOSOL 300, ISOSOL 400, TECLEAN N-16, TECLEAN N-20, TECLEAN N-22, AF SOLVENT No. 4, AF SOLVENT No. 5, AF SOLVENT No. 6, AF SOLVENT No. 7, NAPHTHESOL 160, NAPHTHESOL 200, and NAPHTHESOL 220 (all trade names, manufactured by JX Nippon Oil & Energy Corporation); and Isopar G, Isopar H, Isopar L, Isopar M, Exxsol D40, Exxsol D60, Exxsol D80, Exxsol D95, Exxsol D110, and Exxsol D130 (all trade names, manufactured by TonenGeneral Sekiyu K.K.). Preferred examples of the aromatic hydrocarbon solvents can include GRADE ALKENE L and GRADE ALKENE 200P (all trade names, manufactured by JX Nippon Oil & Energy Corporation), and Solvesso 100, Solvesso 150, Solvesso 200, and Solvesso 200ND (all trade names, manufactured by TonenGeneral Sekiyu K.K.). The distillation initial boiling point of the petroleum hydrocarbon solvents is preferably 100° C. or more, more preferably 150° C. or more, and still more preferably 200° C. or more. The distillation initial boiling point can be measured according to JIS K0066 "Test methods for distillation of chemical products."

Preferred examples of the polar organic solvents can include fatty acid ester solvents, higher alcohol solvents, and higher fatty acid solvents. Examples thereof include fatty acid ester solvents having 13 or more, preferably 16 to 30, carbon atoms in one molecule such as isononyl isononanoate, isodecyl isononanoate, methyl laurate, isopropyl laurate, hexyl laurate, isopropyl myristate, isopropyl palmitate, hexyl palmitate, isooctyl palmitate, isostearyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate, soybean oil methyl, soybean oil isobutyl, tall oil methyl, and tall oil isobutyl; higher alcohol solvents having 6 or more, preferably 12 to 20, carbon atoms in one molecule such as isomyristyl alcohol, isopalmityl alcohol, isostearyl alcohol, oleyl alcohol, isoeicosyl alcohol, and decyltetradecanol; and higher fatty acid solvents having 12 or more, preferably 14 to 20, carbon atoms in one molecule such as lauric acid, isomyristic acid, palmitic acid, isopalmitic acid, α-linolenic acid, linoleic acid, oleic acid, and isostearic acid. The boiling point of the polar organic solvents such as fatty acid ester solvents, higher alcohol solvents, and higher fatty acid solvents is preferably 150° C. or more, more preferably 200° C. or more, and further preferably 250° C. or more. Nonaqueous solvents having a boiling point of 250° C. or more also include nonaqueous solvents that do not exhibit a boiling point.

These nonaqueous solvents may be used alone, and two or more of these nonaqueous solvents can also be used in combination as long as they form a single phase. In addition, another organic solvent may be contained in a range that can form a single phase with the nonaqueous solvent used.

1-3. Water-Soluble Resin Having Amino Group

The first nonaqueous ink of the present invention comprises a water-soluble resin having an amino group. According to the present invention, since the water-soluble resin having an amino group is contained in the first nonaqueous ink, bleeding and strike-through of coloring pigments and inorganic particles such as silica contained in a second nonaqueous ink can be prevented. For example, it is presumed that by the bonding of a substituent (an acidic substituent such as a carboxyl group, a sulfonic acid group, or a hydroxyl group) on the surface of the above coloring pigment to an amino group in the above water-soluble resin in the first nonaqueous ink, the coloring pigment contained in the first nonaqueous ink is inhibited from permeating a printing medium together with the nonaqueous solvent, and further by depositing the second nonaqueous ink so as to overlap with the first nonaqueous ink, a substituent (an acidic substituent such as a carboxyl group, a sulfonic acid group, or a hydroxyl group) on the surface of the above inorganic particle is bonded to an amino group in the above water-soluble resin, and bleeding and strike-through are even more strongly suppressed. At the same time, it is presumed that the coloring pigment such as carbon black and the inorganic particles such as silica contained in the second nonaqueous ink are inhibited from permeating the printing medium together with a nonaqueous solvent to cause bleeding and strike-through.

The above water-soluble resin needs to have an amino group for reactivity with the substituent (acidic substituent such as a carboxyl group, a sulfonic acid group, or a hydroxyl group) on the pigment surface. Specific examples thereof can include basic polymer electrolytes such as polyethylenimine (PEI), polyvinylamine, polyallylamine, and polyvinylpyridine, or derivatives thereof. Particularly, polyethylenimine having a number average molecular weight of 200 to 2000, or modified polyethylenimine obtained by the addition reaction of polyethylenimine having a number average molecular weight of 200 to 2000 and either an acrylate or vinyl compound can be preferably used. The modified polyethylenimine preferably has a ratio of the acrylate or vinyl compound of 0.3 molar equivalent or more and less than 1 molar equivalent, provided that the total amine value of the polyethylenimine is 1 molar equivalent. Here, the amine value is calculated by obtaining an amine value (KOH mg/g) in accordance with (2) Indicator titration method under JIS K-7237-1995 (Testing method for total amine values of amine-based hardeners of epoxide resins), followed by conversion using the molecular weight of KOH, 56.11 mg/mmol.

When the number average molecular weight of the polyethylenimine is 200 or more, the effect of enhancing printing density on plain paper is significant. When the number average molecular weight of the polyethylenimine is 2000 or less, the storage stability is improved regardless of the storage environment. The number average molecular weight of the polyethylenimine is more preferably 300 to 1800 because of the significant effect of enhancing printing density and the pour point of −5° C. or less which leads to good storage stability at low temperature.

As the polyethylenimine, commercially-available polyethylenimine can be used. Preferred examples thereof can include EPOMIN SP-006, SP-012, SP-018, and SP-200 (all trade names) manufactured by NIPPON SHOKUBAI CO., LTD.; and Lupasol FG, Lupasol G20 Waterfree, and Lupasol PR 8515 (all trade names) manufactured by BASF.

The content of the water-soluble resin is preferably 0.2 to 10% by mass, more preferably 0.5 to 5% by mass, based on 100% by mass of the total amount of the first nonaqueous ink.

1-4. Pigment-Dispersing Agent

A pigment-dispersing agent is preferably contained in the first nonaqueous ink according to the present invention in order to ensure the dispersion stability of the coloring pigment.

The pigment-dispersing agent that can be used in the present invention is not particularly limited as long as it stably disperses the pigment in the nonaqueous solvent. For example, hydroxyl group-containing carboxylates, salts of long chain polyaminoamides and high molecular weight acid esters, salts of high molecular weight polycarboxylic acids, salts of long chain polyaminoamides and polar acid esters, high molecular weight unsaturated acid esters, high molecular copolymers, modified polyurethanes, modified polyacrylates, polyether ester type anionic activators, naphthalenesulfonic acid formalin condensate salts, polyoxyethylene alkyl phosphates, polyoxyethylene nonylphenyl ether, polyester polyamines, stearylamine acetate, and alkyl acrylic polymers having a β-diketone group or a β-keto acid ester group are preferably used. Among them, compounds having an amino group, particularly polymer dispersing agents having an amino group, are preferably used.

The pigment-dispersing agent is preferably contained in total at a mass ratio of 0.05 to 2 relative to 1 of the coloring pigment.

The blending amount of the pigment-dispersing agent is preferably 1 to 15% by mass, more preferably 2 to 10% by mass, based on 100% by mass of the total amount of the first nonaqueous ink.

1-5. Other Ink Components

In addition to the above components, commonly used additives may be contained in the first nonaqueous ink. Examples of the additives include surfactants, for example, anionic, cationic, amphoteric, or nonionic surfactants, and antioxidants, for example, dibutylhydroxytoluene, propyl gallate, tocopherol, butylhydroxyanisole, and nordihydroguaiaretic acid.

1-6. Properties of First Nonaqueous Ink

When being used in an inkjet recording system, the suitable range of viscosity of the first nonaqueous ink is varied depending on nozzle diameter of ejection heads, ejection environment and the like, and generally is preferably 5 to 30 mPa·s, more preferably 5 to 15 mPa·s at 23° C., and is suitably the order of about 10 mPa·s for use in an inkjet recording apparatus.

1-7. Method for Preparing First Nonaqueous Ink

The method for preparing the first nonaqueous ink is not particularly limited, and, for example, it can be prepared by mixing a coloring pigment, a water-soluble resin, and other components as needed, in a nonaqueous solvent at once or in portions, introducing the mixture into a pigment dispersing apparatus such as a bead mill for dispersion, and passing the dispersion through a filtration apparatus such as a membrane filter as desired.

2. Second Nonaqueous Ink

The second nonaqueous ink used in the present invention comprises at least a coloring pigment, inorganic particles, and a nonaqueous solvent and may contain other components as needed.

2-1. Nonaqueous Solvent

The nonaqueous solvent should be one that can constitute a vehicle of the second nonaqueous ink, and the nonaqueous solvents described for the above first nonaqueous ink can be used. Among these, nonpolar organic solvents, particularly, petroleum hydrocarbon solvents such as aliphatic hydrocarbon solvents, alicyclic hydrocarbon solvents, and aromatic hydrocarbon solvents, and the like, are preferably used.

2-2. Coloring Pigment

As the coloring pigment, those used in printing inks can be used without particular limitation, and the coloring pigments described for the above first nonaqueous ink can be used. The coloring pigment contained in the second nonaqueous ink preferably has the same color as the coloring pigment contained in the first nonaqueous ink and is more preferably the same coloring pigment as the coloring pigment contained in the first nonaqueous ink.

When the content of the coloring pigment in the second nonaqueous ink is lower than the content of the coloring pigment in the above first nonaqueous ink, the effect of the present invention can be achieved. But, from the viewpoint of printing density and ink viscosity, the content of the coloring pigment in the second nonaqueous ink is preferably 0.1 to 10% by mass, still more preferably 0.5 to 5% by mass, based on 100% by mass of the total amount of the second nonaqueous ink.

The mass ratio of the content of the coloring pigment contained in the first nonaqueous ink to the content of the coloring pigment in the second nonaqueous ink is preferably 1:0.05 to 1:0.5, still more preferably 1:0.15 to 1:0.3, from the viewpoint of the balance between printing density and gradation.

The average particle diameter of the coloring pigment in the second nonaqueous ink is preferably 500 nm or less, more preferably 150 nm or less, from the viewpoint of ejection stability and storage stability. Here, the average particle diameter of the pigment is a volume-based value measured by a dynamic light scattering type particle size distribution measuring apparatus LB-500 manufactured by HORIBA, Ltd.

2-3. Inorganic Particles

As the inorganic particles, those having lower coloring power than the coloring pigment used in the first nonaqueous ink can be used. These inorganic particles do not include the above coloring pigment contained in the second nonaqueous ink. As the inorganic particles, for example, extender pigments such as talc, diatomaceous earth, calcium carbonate, barium carbonate, barium sulfate, alumina white, silica, kaolin, mica, acid clay, activated clay, and bentonite can be used, and two or more of these may be used in combination. Among these, silica is preferred in terms of improvement in printing density.

The silica is not particularly limited. Examples thereof include powdered silica, colloidal silica, and synthetic amorphous silica. These can be used alone, or two or more of these can be used in combination. As the powdered silica, for example, AEROSIL 90, OX50, R102, R104, and R106 (all trade names) manufactured by NIPPON AEROSIL CO., LTD., and E-200A, E-220A, K-500, E-1009, E-1011, E-1030, E-150J, and E-170 (all trade names) manufactured by Tosoh Silica Corporation can be used. As the colloidal silica, for example, SNOWTEX S, OS, XS, OXS, 20, 30, 40, 50, O, AK, AK-YL, O-40, CM, 20L, C, ZL, XL, N, and UP (all trade names) manufactured by Nissan Chemical Industries, Ltd., Quartron PL-1, PL-3, PL-7, and PL-20 (all trade names) manufactured by FUSO CHEMICAL CO., LTD., and Silicaloid, Silicaloid-LL, and Silicaloid-A (all trade names) manufactured by Sanko Colloid Chemical Co., LTD can be used. The synthetic amorphous silica is formed by the neutralization reaction of a silicate and an acid and can be classified into various properties according to its production method, and, for example, MIZUKASIL P-73, P-78A, P-707, P-709, P-527, and P-803 (all trade names) manufactured by Mizusawa Industrial Chemicals, Ltd. can be used.

The primary particle diameter of the silica is preferably 5 to 100 nm, more preferably 7 to 50 nm. When the primary particle diameter of the silica is in this range, strike-through can be reduced to obtain still higher printing density.

The content of the silica in the second nonaqueous ink is preferably 1 to 20% by mass, more preferably 5 to 20% by mass, as solid content. When the content of the silica is in the range of 1 to 20% by mass, the effect of reducing strike-through and improving printing density can be sufficiently obtained, and the prevention of the diffuse reflection of light on a printing medium, and the dispersion stability of the silica in an aftertreatment agent can be maintained well.

2-4. Other Components

A pigment-dispersing agent, an antioxidant, a preservative, and the like can be contained in the second nonaqueous ink as needed. As the pigment-dispersing agent, those described above for the first nonaqueous ink can be used.

2-5. Properties of Second Nonaqueous Ink

The properties described for the first nonaqueous ink are exactly applied to the second nonaqueous ink.

2-6. Method for Preparing Second Nonaqueous Ink

The method for preparing the second nonaqueous ink is not particularly limited, and, for example, the second nonaqueous ink can be prepared by mixing a coloring pigment, inorganic particles, and other components as needed, in a nonaqueous solvent at once or in portions, introducing the mixture into a pigment dispersing apparatus such as a bead mill for dispersion, and passing the dispersion through a filtration apparatus such as a membrane filter as desired. A dispersion of a coloring pigment and a dispersion of inorganic particles may be separately prepared, and mixed after dispersion.

3. Printing Method

The inkjet printing method of the present invention can be carried out by printing an image on a printing medium by an inkjet recording system using the first nonaqueous ink, and then printing an image so as to overlap with the preceding image by an inkjet recording system using the second nonaqueous ink. Here, the sentence "so as to overlap with the preceding image" means that at least part of the image formed with the first nonaqueous ink and at least part of the image formed with the second nonaqueous ink overlap with each other.

In the inkjet printing system of the present invention, when an image is formed on a printing medium using the first nonaqueous ink, and then an image is formed so as to overlap with the preceding image using the second nonaqueous ink, both inks mix with each other, and an amino group in the water-soluble resin present on the surface of the coloring pigment of the first nonaqueous ink is bonded to a hydroxyl group on the surface of the inorganic particle.

Finally, the dispersion stability of the coloring pigment in the first nonaqueous ink breaks down so that the coloring pigment aggregates, and therefore it is considered that the coloring pigment easily remains on the surface of the printing medium, thereby improving the printing density.

In a state in which the water-soluble resin is not adsorbed on the coloring pigment, the water-soluble resin cannot continue to be uniformly present in the nonaqueous solvent. However, since the coloring pigment and the inorganic particles have a few hydrophilic substituents (hydroxyl groups or the like), they can adsorb the water-soluble resin after being blended together in a dispersing machine or the like. Therefore, the water-soluble resin can continue to be uniformly present in the first nonaqueous ink, and can efficiently bind the coloring pigment in the first nonaqueous ink to the inorganic particles in the second nonaqueous ink even in a short time before permeation and immediately after landing, and thus the effect of improving printing density is exhibited.

In the present invention, the time interval from the formation of dots of the first nonaqueous ink until the landing of droplets of the second nonaqueous ink to overlap with the dots of the first nonaqueous ink is preferably 0.001 to 100 seconds, more preferably 0.01 to 1 second.

In addition, in the inkjet printing method of the present invention, a multidrop system is preferably adopted as the inkjet recording system that can enhance gradation. The multidrop system is a system in which gradation expression is performed by controlling the number of ink drops of almost the same size ejected for one pixel. As the number of ink drops increases, the surface printing density increases for black, and for RGB, the color gamut increases, and the gradation is also enhanced. Also, strike-through that would deteriorate due to an increase in bleeding can be inhibited by the printing method of the present invention.

In addition, in the inkjet printing method of the present invention, the gradation can be further enhanced by making the resolution of the second nonaqueous ink lower than the resolution of the first nonaqueous ink. The resolution can be arbitrarily set, for example, by varying the distance between nozzles of inkjet heads for ejecting the respective nonaqueous inks. Even though it is considered that as an image is formed at a higher resolution, the gradation becomes better, the gradation can be even more increased according to the present invention by decreasing the resolution of the second nonaqueous ink.

In this manner, the gradation can be enhanced in the inkjet printing method according to the present invention by keeping the number of drops and the resolution in suitable ranges according to the properties of the ink so as to increase the printing density and the color gamut.

In the inkjet printing method of the present invention, examples of a method for allowing droplets of the second nonaqueous ink to overlap with dots of the first nonaqueous ink include (1) forming a plurality of rows of dots of the first nonaqueous ink on a printing medium surface, and then ejecting the second nonaqueous ink so that droplets of the second nonaqueous ink land on the dots of the first nonaqueous ink, (2) forming a plurality of rows of dots of the first nonaqueous ink on a printing medium surface, and then ejecting the second nonaqueous ink so that droplets of the second nonaqueous ink land in the gaps between neighboring dots of the first nonaqueous ink, and (3) forming a plurality of rows of dots of the first nonaqueous ink on a printing medium surface, and then ejecting the second nonaqueous ink at a resolution lower than that of the first nonaqueous ink so that each one droplet of the second nonaqueous ink lands across a plurality of dots of the first nonaqueous ink. Among these, the method of the above (3) is preferably adopted in order to achieve both high printing density and good gradation. Examples of a specific mode of the above (3) include printing the second nonaqueous ink at 450×450 dpi or 300×300 dpi when printing the first nonaqueous ink at 600×600 dpi, and printing the second nonaqueous ink at 300×300 dpi or 150×150 dpi when printing the first nonaqueous inks at 450×450 dpi. When the printing resolution of the first nonaqueous ink is higher than the printing resolution of the second nonaqueous ink as in the method of the above (3), dots of the first nonaqueous ink easily bleed after printing, and therefore the gradation (gradation levels) are improved, and particularly when the printing resolution of the first nonaqueous ink is a low resolution of 450×450 dpi or less, an effect of improving granularity of image is obtained.

FIG. 1 schematically shows a state after printing in the mode of the above (1) using the first nonaqueous ink and the second nonaqueous ink. In other words, FIG. 1 shows a state in which droplets 12 of the second nonaqueous ink land on dots in rows of dots 10 of the first nonaqueous ink. In order to land droplets in this manner, control should be performed so that droplets of the first nonaqueous ink land on a printing medium and then droplets of the second nonaqueous ink land at the same positions as the droplets of the first nonaqueous ink. For example, it is recommended that nozzles for ejecting the first nonaqueous ink and nozzles for ejecting the second nonaqueous ink are provided in an inkjet printer, and the arrangement of the nozzles, the printing medium conveying mechanism, and the inkjet head scanning mechanism, and the like are set so that after the ejection of droplets of the first nonaqueous ink, droplets of the second nonaqueous ink are ejected. For an inkjet printer, such a control method is well-known.

Figure 2:
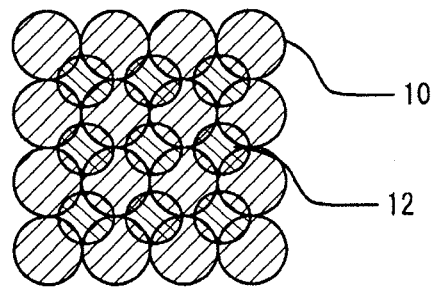
FIG. 2 is a plan view schematically showing a state in which droplets of the second nonaqueous ink land in the gaps between neighboring dots of the first nonaqueous ink.

On the other hand, FIG. 2 schematically shows a state after printing in the mode of the above (2) using the first nonaqueous ink and the second nonaqueous ink. In other words, FIG. 2 shows a state in which droplets 12 of the second nonaqueous ink land in the gaps between neighboring dots in rows of dots 10 of the first nonaqueous ink. The means for landing droplets of the second nonaqueous ink in the gaps between neighboring dots of the first nonaqueous ink in this manner is not particularly limited. Examples thereof include the following means.

Figure 3:
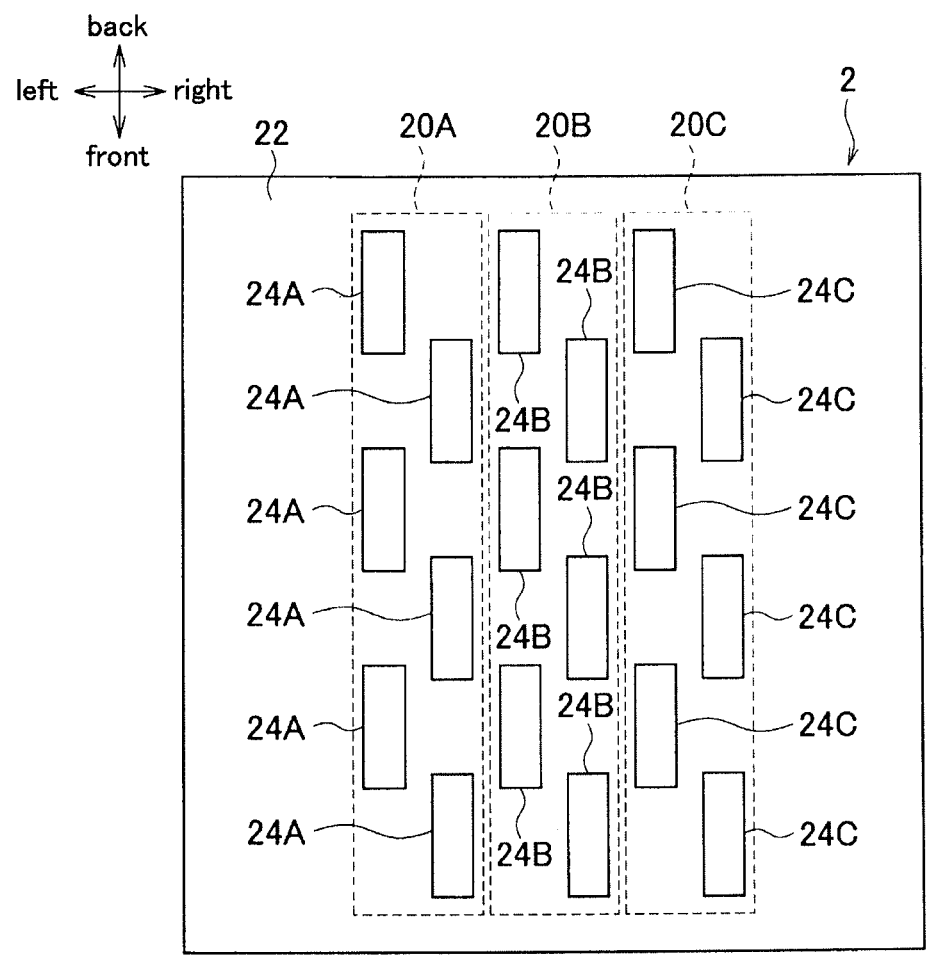
FIG. 3 is a plan view of the inkjet heads of a line type inkjet printer.

FIG. 3 is a plan view showing the conveying portion of a line type inkjet printer. In the conveying portion 2, a conveying belt 22 for conveying a printing medium by moving in the right-and-left direction in the plane of FIG. 3, and inkjet heads 20A to 20C positioned above the conveying belt for ejecting inks or the like to the conveyed printing medium are arranged. The inkjet heads 20A to 20C comprise a plurality of nozzles for ejecting droplets of an ink or the second nonaqueous ink toward the printing medium.

Specifically, the inkjet head 20A has a plurality of head units 24A. In the example shown in FIG. 3, the inkjet head 20A is composed of six head units 24A. The six head units 24A are arranged in a staggered manner. More specifically, the six head units 24A are arranged in the direction (back-and-forth direction) generally orthogonal to the paper (printing medium) conveying direction (right-and-left direction) and arranged in positions alternately displaced in the conveying direction. The inkjet head 20B is composed of six head units 24B. The inkjet head 20C is composed of six head units 24C. The six head units 24B and the six head units 24C are arranged in a staggered manner like the six head units 24A. The head units 24A to 24C are fixed to a head holder (not shown). The head units 24A to 24C have a similar configuration except that the ejected ink is different as described later.

In the following description, sometimes, the alphabetical indices (A to C) in the symbols of the inkjet heads 20A to 20C and the head units 24A to 24C are omitted, in order that they are collectively described.

Figure 4:
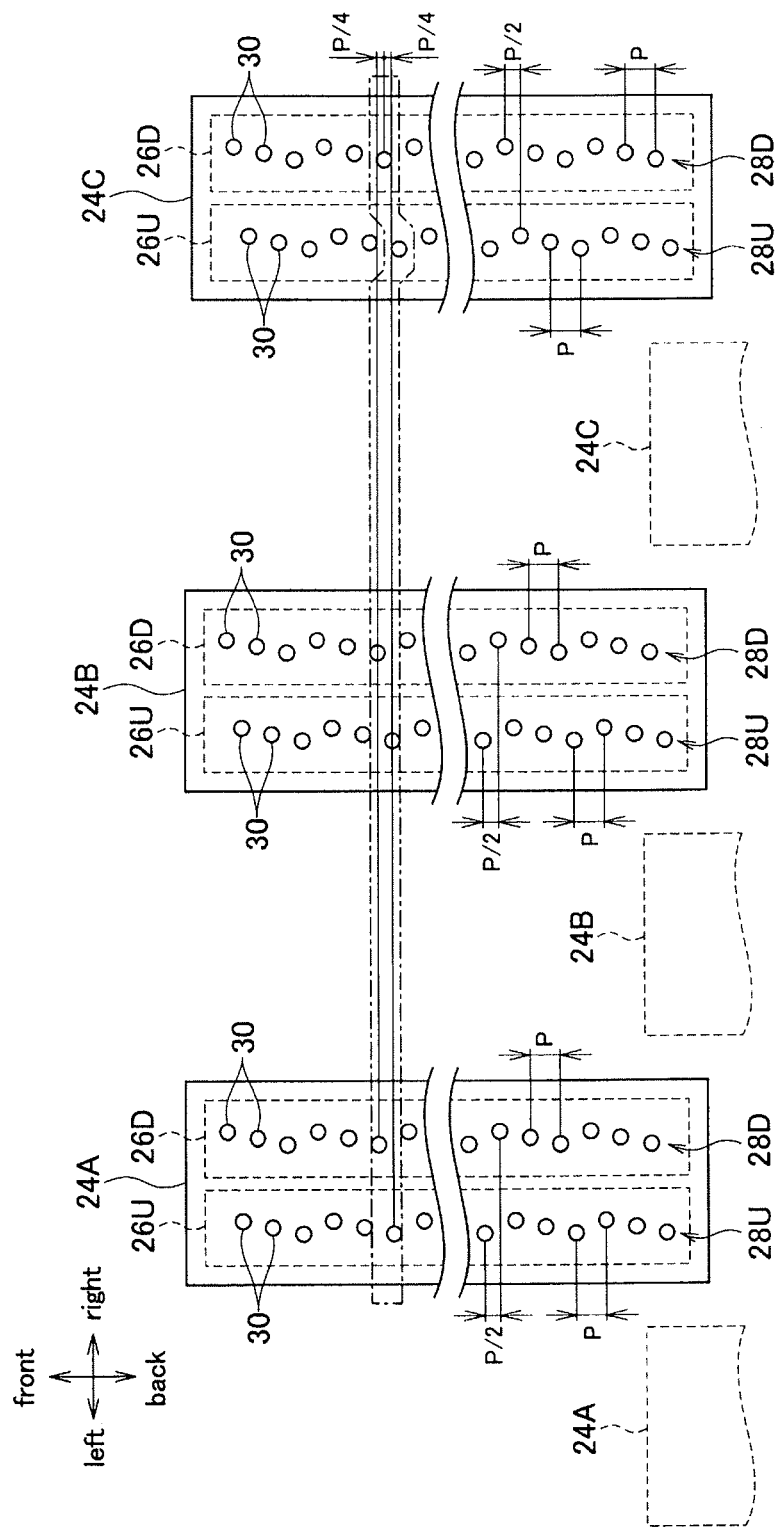
FIG. 4 is a schematic configuration diagram of some of the head units positioned in the inkjet heads shown in FIG. 3.

The head unit 24 has two ink chambers 26U and 26D and two nozzle rows 28U and 28D as shown in FIG. 4. Here, FIG. 4 is a diagram in which the head units 24A to 24C in the same row along the right-and-left direction are seen from the lower side. Sometimes, the alphabetical indices (U and D) in the symbols of the ink chambers 26U and 26D and the nozzle rows 28U and 28D are omitted, in order that they are collectively described.

The ink chamber 26 stores the first nonaqueous ink or the second nonaqueous ink. The ink is supplied to the ink chamber 26 through an ink path (not shown). A piezo element (not shown) is arranged in the ink chamber 26. The ink is ejected from nozzles 30 described later by the driving of the piezo element.

A black color ink is supplied to both the ink chambers 26U and 26D of the head unit 24A. A cyan color ink is supplied to the ink chamber 26U of the head unit 24B. A magenta color ink is supplied to the ink chamber 26D of the head unit 24B. A yellow color ink is supplied to the ink chamber 26U of the head unit 24C. The second nonaqueous ink according to the present invention is supplied to the ink chamber 26D of the head unit 24C.

The nozzle row 28 comprises a plurality of nozzles 30 for ejecting an ink. In each nozzle row 28, the plurality of nozzles 30 are arranged at a predetermined pitch P at equal intervals in the main scanning direction (back-and-forth direction). The nozzle row 28U on the upstream side and the nozzle row 28D on the downstream side are arranged in parallel in the paper conveying direction (right-and-left direction). In addition, the nozzles 30 in the nozzle row 28U and the nozzles 30 in the nozzle row 28D are arranged so as to be displaced by a half pitch (P/2) in the main scanning direction.

The nozzle rows 28U and 28D of the head unit 24A eject the black color ink supplied to the ink chambers 26U and 26D of the head unit 24A. By ejecting the black color ink from the two nozzle rows 28U and 28D, the printing resolution of black can be higher than those of other colors. The nozzle rows 28U and 28D of the head unit 24B eject the cyan and magenta color inks supplied to the ink chambers 26U and 26D of the head unit 24B respectively. The nozzle rows 28U and 28D of the head unit 24C eject the yellow color ink and the second nonaqueous ink supplied to the ink chambers 26U and 26D of the head unit 24C respectively.

Here, the head unit 24A and the head unit 24B are arranged so that the nozzle positions in the main scanning direction match. In other words, in the nozzle row 28U of the head unit 24A and the nozzle row 28U of the head unit 24B, the positions of the nozzles 30 in the main scanning direction match. In addition, in the nozzle row 28D of the head unit 24A and the nozzle row 28D of the head unit 24B, the positions of the nozzles 30 in the main scanning direction match.

On the other hand, the head unit 24C is arranged so that the barycentric position, in the main scanning direction, of four nozzles 30 in the nozzle rows 28U and 28D of the head units 24A and 24B corresponding to the same pixel (dot) match the central position, in the main scanning direction, of the nozzle 30 in the nozzle row 28D of the head unit 24C corresponding to the above pixel. Here, the barycentric position, in the main scanning direction, of four nozzles 30 in the nozzle rows 28U and 28D of the head units 24A and 24B corresponding to the same pixel means the same as the barycentric position, in the main scanning direction, of the pixel formed on the paper with the inks ejected from these four nozzles 30. In addition, the central position, in the main scanning direction, of the nozzle 30 in the nozzle row 28D of the head unit 24C corresponding to the above pixel means the same as the central position, in the main scanning direction, of the pixel formed on the paper with the ink ejected from the nozzles 30. In addition, the "match" is not limited to a perfect match and includes fluctuations in a predetermined range. This predetermined range can, for example, be experimentally determined.

A combination of the nozzles 30 in the head units 24A to 24C corresponding to the same pixel is shown in FIG. 4 surrounded by a dashed-dotted line.

In the head units 24A and 24B, the nozzles 30 in the nozzle rows 28U and the nozzles 30 in the nozzle rows 28D corresponding to the same pixel are displaced by a half pitch (P/2) in the main scanning direction. In the nozzle row 28U of the head unit 24A and the nozzle row 28U of the head unit 24B, the positions, in the main scanning direction, of the nozzles 30 corresponding to the same pixel match. In addition, in the nozzle row 28D of the head unit 24A and the nozzle row 28D of the head unit 24B, the positions, in the main scanning direction, of the nozzles 30 corresponding to the same pixel match.

Therefore, the barycentric position, in the main scanning direction, of four nozzles 30 in the head units 24A and 24B corresponding to the same pixel are the intermediate position in the main scanning direction between the nozzles 30 in the nozzle rows 28U and the nozzles 30 in the nozzle rows 28D corresponding to the same pixel.

Therefore, the head unit 24C is arranged so that the central position of the nozzle 30 in the nozzle row 28D of the head unit 24C matches the intermediate position between the nozzles 30 in the nozzle rows 28U and the nozzles 30 in the nozzle rows 28D in the head units 24A and 24B corresponding to the same pixel in the main scanning direction as shown in FIG. 4. Therefore, pixels formed with droplets ejected from the nozzles 30 of the head unit 24C are in a state of being displaced by a half pitch in the main scanning direction from pixels formed with droplets ejected from the nozzles 30 of the head units 24A and 24B.

By the configuration of the inkjet heads as described above, pixels formed with droplets of the second nonaqueous ink are in a state of being displaced by a half pitch in the main scanning direction from pixels formed with droplets of the first nonaqueous ink. In addition, in order to also form pixels formed with droplets of the second nonaqueous ink, in the sub-scanning direction, in a state of being displaced by a half pitch from pixels formed with droplets of the first nonaqueous ink, ejection timing should be controlled so that droplets of the second nonaqueous ink land on the conveyed printing medium in a state of being displaced by a half pitch from pixels formed with droplets of the first nonaqueous ink. Printing as described above results in a state of being displaced by a half pitch in both the main scanning direction and the sub-scanning direction, that is, a state in which droplets 12 of the second nonaqueous ink land in the gaps between neighboring dots of the first nonaqueous ink as shown in FIG. 2.

In the present invention, the printing medium is not particularly limited as long as the inks used in the present invention can permeate it. Printing paper such as plain paper, coated paper, and special paper, cloth, inorganic sheets, porous sheets, films, OHP sheets, and adhesive sheets in which adhesive layers are provided on the back surfaces of these, and the like can be used. Impermeable base materials to the surfaces of which the above permeable printing mediums are bonded can be used. Among these, printing paper such as plain paper and coated paper can be preferably used.

The plain paper is printing paper on the surface of which an ink-receiving layer, a film layer, or the like is not formed. Examples of the plain paper can include high quality paper, medium quality paper, PPC paper, poor quality paper, and recycled paper. In addition, as the coated paper, the so-called coated printing paper and inkjet coated paper can be preferably used. The coated printing paper is printing paper conventionally used in letterpress printing, offset printing, gravure printing, and the like and is printing paper obtained by providing a coating layer on the surface of high quality paper or medium quality paper using a paint comprising an inorganic pigment such as clay or calcium carbonate and a binder such as starch. The coated printing paper is classified into slightly coated paper, high quality lightweight coated paper, medium quality lightweight coated paper, high quality coated paper, medium quality coated paper, art paper, cast coated paper, and the like according to the amount of the paint coated and the coating method. Examples of the inkjet coated paper can include matte paper and photo glossy paper.

EXAMPLES

The present invention will be described in detail below by way of Examples and Comparative Examples, but the present invention is not limited only to these Examples.

<Making of First Nonaqueous Inks>

A coloring pigment, a pigment-dispersing agent, a nonaqueous solvent, and a water-soluble resin were mixed in a proportion shown in Table 1 and dispersed by DYNO-MILL (manufactured by Shinmaru Enterprises Corporation) filled with zirconia beads (diameter 0.5 mm) at a filling rate of 85% under the condition of a residence time of 15 minutes to make each of the first nonaqueous inks K1 to K3.

TABLE 1

Blending ratios of the first nonaqueous ink

| | Type | | K-1 | K-2 | K-3 |
|---|---|---|---|---|---|
| Composition | Coloring pigment | Black pigment | 10.0 | | 2.0 |
| | | Cyan pigment | | 8.0 | |
| | Pigment-dispersing agent | | 25.0 | 20.0 | 10.0 |
| | Nonaqueous solvent | Petroleum hydrocarbon solvent | 64.0 | 40.0 | 87.0 |
| | | Fatty acid ester solvent | | 31.0 | |
| | Water-soluble resin having amino group | Polyethylenimine | 1.0 | | 1.0 |
| | | Polyallylamine | | 1.0 | |
| Total | | | 100.0 | 100.0 | 100.0 |

Details of the respective components described in Table 1 are as follows:

Black pigment: carbon black manufactured by Mitsubishi Chemical Corporation, MA8 (trade name)

Cyan pigment: copper phthalocyanine pigment manufactured by DIC CORPORATION, Fastogen Blue 5486 (trade name)

Pigment-dispersing agent: manufactured by Lubrizol Japan Limited, Solsperse 13940 (trade name) (effective component ratio 30%)

Petroleum hydrocarbon solvent: aliphatic hydrocarbon solvent (isoparaffin) manufactured by TonenGeneral Sekiyu K.K., Isopar G (trade name)

Fatty acid ester solvent: methyl oleate manufactured by Kao Corporation, EXCEPARL M-OL (trade name)

Polyethylenimine: manufactured by NIPPON SHOKUBAI CO., LTD., EPOMIN SP-012 (trade name) (weight average molecular weight 1200)

Polyallylamine: manufactured by NITTOBO MEDICAL CO., LTD., PAA-01 (trade name) (number average molecular weight 1600)

<Making of Second Nonaqueous Inks>

Silica, a coloring pigment, a pigment-dispersing agent, and a nonaqueous solvent were mixed in a proportion shown in Table 2 and dispersed by DYNO-MILL (manufactured by SHINMARU ENTERPRISES CORPORATION) filled with zirconia beads (diameter 0.5 mm) at a filling rate of 85% under the condition of a residence time of 15 minutes to make each of the second nonaqueous inks S1 to S6.

TABLE 2

Blending ratios of the second nonaqueous ink

| | Type | | S-1 | S-2 | S-3 | S-4 | S-5 | S-6 |
|---|---|---|---|---|---|---|---|---|
| Composition | Inorganic particles | Silica | 5.0 | 5.0 | 5.0 | | 5.0 | 5.0 |
| | Coloring pigment | Black pigment | 1.0 | 2.0 | | 2.0 | 5.0 | |
| | | Cyan pigment | | | | | | 2.5 |
| | Pigment-dispersing agent | | 12.5 | 12.5 | 12.5 | 12.5 | 12.5 | 12.5 |
| | Nonaqueous solvent | Petroleum hydrocarbon solvent | 81.5 | 80.5 | 82.5 | 85.5 | 77.5 | 40.0 |
| | | Fatty acid ester solvent | | | | | | 40.0 |
| Total | | | 100.0 | 100.0 | 100.0 | 100.0 | 100.0 | 100.0 |

Details of the respective components described in Table 2 are as follows:

Silica: manufactured by NIPPON AEROSIL CO., LTD., AEROSIL R104 (trade name) (primary particle diameter 12 nm, specific surface area 200 m$^2$/g)

Black pigment: carbon black manufactured by Mitsubishi Chemical Corporation, MA8 (trade name)

Cyan pigment: copper phthalocyanine pigment manufactured by DIC CORPORATION, Fastogen Blue 5486 (trade name)

Pigment-dispersing agent: manufactured by Lubrizol Japan Limited, Solsperse 13940 (trade name) (effective component ratio 30%)

Petroleum hydrocarbon solvent: aliphatic hydrocarbon solvent (isoparaffin) manufactured by TonenGeneral Sekiyu K.K., Isopar G (trade name)

Fatty acid ester solvent: methyl oleate manufactured by Kao Corporation, EXCEPARL M-OL (trade name)

Examples 1 to 11 and Comparative Examples 1 to 4

Figure 5:
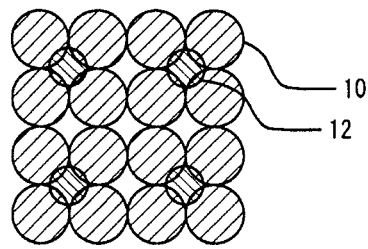
FIG. 5 shows examples in which a first nonaqueous ink is printed at a resolution higher than that of a second nonaqueous ink, and (a) is an example in which five drops (30 pl in the Examples) of the first nonaqueous ink are ejected by a multidrop system, and one drop (6 pl in the Examples) of the second nonaqueous ink is ejected at a resolution ½ that of the first nonaqueous ink by the multidrop system, (b) is an example in which five drops (30 pl in the Examples) of the first nonaqueous ink are ejected by a multidrop system, and the second nonaqueous ink is not ejected, (c) is an example in which three drops (18 pl in the Examples) of the first nonaqueous ink are ejected by a multidrop system, and one drop (6 pl in the Examples) of the second nonaqueous ink is ejected at a resolution ½ that of the first nonaqueous ink by the multidrop system, (d) is an example in which three drops (18 pl in the Examples) of the first nonaqueous ink are ejected by a multidrop system, and the second nonaqueous ink is not ejected, (e) is an example in which one drop (6 pl in the Examples) of the first nonaqueous ink is ejected by a multidrop system, and one drop (6 pl in the Examples) of the second nonaqueous ink is ejected at a resolution ½ that of the first nonaqueous ink by the multidrop system, and (f) is an example in which one drop (6 pl in the Examples) of the first nonaqueous ink is ejected by a multidrop system, and the second nonaqueous ink is not ejected.
Figure 5:
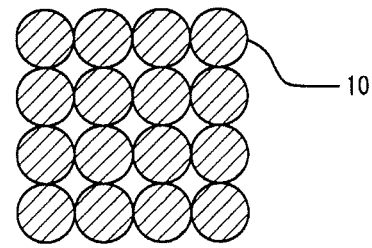
Figure 5:
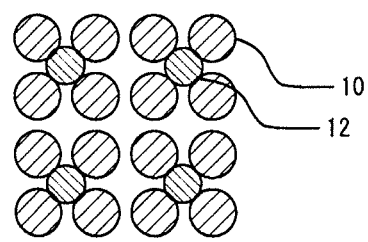
Figure 5:
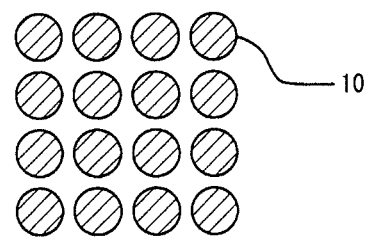
Figure 5:
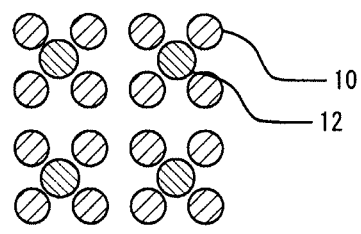
Figure 5:
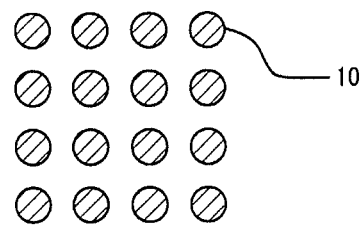

The first nonaqueous ink shown in Table 3 was loaded into an inkjet printer "ORPHIS X9050" (trade name, manufactured by RISO KAGAKU CORPORATION), and a second nonaqueous ink shown in Table 3 was loaded into the same printer. An image was printed on plain paper "RISO YOSHI, USUKUCHI" (trade name, manufactured by RISO KAGAKU CORPORATION) at a resolution shown in Table 3 using the first nonaqueous ink, and an image was printed at a resolution shown in Table 3 using the second nonaqueous ink so as to overlap with the preceding image. The amounts of droplets of the first nonaqueous ink and the second nonaqueous ink were changed by a multidrop system. The second ink was ejected about 0.05 seconds after the first ink was ejected. Printing density, gradation (smoothness), gradation (highlights), and granularity of the obtained prints were evaluated by the following methods. When the first nonaqueous ink and the second nonaqueous ink were printed at the same resolution, they were printed in a dot arrangement as shown in FIG. 2. When the first nonaqueous ink and the second nonaqueous ink were printed at different resolutions, they were printed in dot arrangements as shown in FIG. 5. In both cases, an image was printed at the 6 gradation levels using the amounts of the first and second nonaqueous inks ejected per dot as in FIG. 5. The results are shown in Table 3.

<Printing Density>

The OD value of the surface of an image in a region where printing density was the highest among the above 6 gradation levels was measured using an optical densitometer (RD920, manufactured by Macbeth) and evaluated according to the following criteria.

Printing Density (OD)
A: 1.10≤OD
B: 1.05≤OD<1.10
C: 1.00≤OD<1.05
D: 0.95≤OD<1.00
E: OD<0.95

<Gradation (Smoothness)>

Evaluation was performed based on a correlation coefficient (R2 value) when the relationship between the printing density and the amounts of the inks ejected at the above 6 gradation levels was plotted on a graph and linear approximation was performed by the least squares method.

A: 0.966≤R2 value
B: 0.962≤R2 value<0.966
C: 0.958≤R2 value<0.962
D: 0.954≤R2 value<0.958
E: R2 value<0.954

<Gradation (Highlights)>

The image of the prints used in the evaluation of the above gradation (smoothness) was visually observed, and evaluation was performed according to the following criteria.

Highlights
A: No unevenness occurs in highlight portions.
B: Unevenness can be confirmed in highlight portions but is extremely slight.
C: Unevenness can be confirmed in highlight portions but is at a level at which there is no problem in usual use.
D: Unevenness can be easily confirmed in highlight portions but is at a level at which there is no problem in printed characters.
E: Unevenness in highlight portions is significant and is at a level at which there is a problem in actual use.

<Granularity>

The image of the prints used in the evaluation of the above gradation (smoothness) was visually observed, and evaluation was performed according to the following criteria.

Granularity
A: a level at which the image has no granular feeling and is very smooth
B: The image has a granular feeling to some extent, but there is no problem in usual use.
C: The image has a granular feeling and looks rough, but there is no problem in printed characters.
D: The image has a significant granular feeling and looks very rough.

TABLE 3

| | | Example 1 | Example 2 | Example 3 | Example 4 | Example 5 | Example 6 | Example 7 | Example 8 | Example 9 | Example 10 | Example 11 | Comparative Example 1 | Comparative Example 2 | Comparative Example 3 | Comparative Example 4 |
|---|---|---|---|---|---|---|---|---|---|---|---|---|---|---|---|---|
| First nonaqueous ink | Type | K-1 | K-1 | K-1 | K-1 | K-1 | K-1 | K-1 | K-1 | K-1 | K-1 | K-2 | K-1 | K-1 | K-3 | K-3 |
| | Resolution | 600 × 600 | 600 × 600 | 600 × 600 | 600 × 600 | 450 × 450 | 450 × 450 | 450 × 450 | 300 × 300 | 300 × 300 | 300 × 300 | 600 × 600 | 600 × 600 | 600 × 600 | 600 × 600 | 600 × 600 |
| Second nonaqueous ink | Type | S-1 | S-2 | S-2 | S-2 | S-2 | S-2 | S-2 | S-2 | S-2 | S-2 | S-6 | S-3 | S-4 | S-2 | S-5 |
| | Resolution | 600 × 600 | 600 × 600 | 450 × 450 | 300 × 300 | 600 × 600 | 450 × 450 | 300 × 300 | 600 × 600 | 450 × 450 | 300 × 300 | 600 × 600 | 600 × 600 | 600 × 600 | 600 × 600 | 600 × 600 |
| Evaluation results | Printing density | B | A | A | A | B | B | B | B | C | C | B | B | C | E | D |
| | R2 | 0.964 | 0.965 | 0.969 | 0.971 | 0.960 | 0.964 | 0.966 | 0.960 | 0.955 | 0.954 | 0.955 | 0.944 | 0.909 | 0.984 | 0.957 |
| | Gradation (smoothness) | B | B | A | A | C | B | B | C | D | D | B | E | E | A | D |

TABLE 3-continued

|  | Example 1 | Example 2 | Example 3 | Example 4 | Example 5 | Example 6 | Example 7 | Example 8 | Example 9 | Example 10 | Example 11 | Comparative Example 1 | Comparative Example 2 | Comparative Example 3 | Comparative Example 4 |
|---|---|---|---|---|---|---|---|---|---|---|---|---|---|---|---|
| Gradation (highlights) | C | B | A | A | C | B | A | B | B | A | C | E | E | B | D |
| Granularity | A | A | A | A | B | A | A | D | D | C | A | A | A | A | A |

From the results in Table 3, it is found that in the case of Examples 1 to 11 according to the printing method of the present invention, printed images having high printing density, and excellent gradation with good gradation levels are obtained. Particularly, from the comparison between Example 2 and Examples 3 and 4 and the comparison between Examples 5 and 6 and Example 7, it is found that when the first nonaqueous ink is printed at a resolution higher than that of the above second nonaqueous ink, a printed image having high printing density, excellent gradation, and improved granularity is easily obtained. On the other hand, in Comparative Example 1 using a second nonaqueous ink containing no coloring pigment and Comparative Example 2 using a second nonaqueous ink containing no inorganic particles, the gradation was poor. In addition, in Comparative Examples 3 and 4 in which the content of the coloring pigment in the first nonaqueous ink was equal to or less than the content of the coloring pigment in the second nonaqueous ink, the printing density was poor, and in Comparative Example 4, further the gradation was also poor.

The present invention can be widely utilized in the field of inkjet printing because it is possible to inkjet-print a printing medium with a nonaqueous pigment ink, and then simply print the medium with an aftertreatment liquid by an inkjet recording system or the like.

The invention claimed is:

1. A nonaqueous inkjet printing method comprising printing a first image by an inkjet recording system using a first nonaqueous ink comprising at least a coloring pigment, a water-soluble resin having an amino group, and a nonaqueous solvent, and then printing a second image so as to overlap with the first image by an inkjet recording system using a second nonaqueous ink, wherein the second nonaqueous ink comprises at least a coloring pigment, inorganic particles, and a nonaqueous solvent, a content of the coloring pigment in the second nonaqueous ink is lower than a content of the coloring pigment in the first nonaqueous ink.

2. The method according to claim 1, wherein the first nonaqueous ink is printed at a resolution higher than the second nonaqueous ink.

3. The method according to claim 2, wherein the printing using the first nonaqueous ink is conducted by forming a plurality of rows of dots of the first nonaqueous ink on a printing medium surface, and the printing using the second nonaqueous ink is conducted by ejecting the second nonaqueous ink at a resolution lower than a resolution of the first nonaqueous ink so that each one droplet of the second nonaqueous ink lands across a plurality of dots of the first nonaqueous ink.

4. The method according to claim 1, wherein the first nonaqueous ink and the second nonaqueous ink are changed in amounts of droplets in accordance with a multidrop system.

5. The method according to claim 4, wherein the printing using the first nonaqueous ink is conducted by forming a plurality of rows of dots of the first nonaqueous ink on a printing medium surface, and the printing using the second nonaqueous ink is conducted by ejecting the second nonaqueous ink at a resolution lower than a resolution of the first nonaqueous ink so that each one droplet of the second nonaqueous ink lands across a plurality of dots of the first nonaqueous ink.

6. The method according to claim 1, wherein a mass ratio of the content of the coloring pigment contained in the first nonaqueous ink to the content of the coloring pigment contained in the second nonaqueous ink is 1:0.05 to 1:0.5.

7. The method according to claim 6, wherein the printing using the first nonaqueous ink is conducted by forming a plurality of rows of dots of the first nonaqueous ink on a printing medium surface, and the printing using the second nonaqueous ink is conducted by ejecting the second nonaqueous ink at a resolution lower than a resolution of the first nonaqueous ink so that each one droplet of the second nonaqueous ink lands across a plurality of dots of the first nonaqueous ink.

8. The method according to claim 1, wherein the printing using the first nonaqueous ink is conducted by forming a plurality of rows of dots of the first nonaqueous ink on a printing medium surface, and the printing using the second nonaqueous ink is conducted by ejecting the second nonaqueous ink so that droplets of the second nonaqueous ink land on the dots of the first nonaqueous ink.

9. The method according to claim 1, wherein the printing using the first nonaqueous ink is conducted by forming a plurality of rows of dots of the first nonaqueous ink on a printing medium surface, and the printing using the second nonaqueous ink is conducted by ejecting the second nonaqueous ink so that droplets of the second nonaqueous ink land in the gaps between neighboring dots of the first nonaqueous ink.

10. The method according to claim 1 wherein the coloring pigment contained in the first nonaqueous ink has the same color as the coloring pigment contained in the second nonaqueous ink.

11. The method according to claim 10, wherein the coloring pigment contained in the first nonaqueous ink is the same coloring pigment as the coloring pigment contained in the second nonaqueous ink.

12. The method according to claim 1, wherein the coloring pigment contained in the first nonaqueous ink is at least one selected from the group consisting of azo pigments, phthalocyanine pigments, polycyclic pigments, dyeing lake pigments, carbon black and titanium oxide.

13. The method according to claim 1, wherein the water-soluble resin having an amino group is at least one selected from the group consisting of polyethylenimine, polyvinylamine, polyallylamine and polyvinylpyridine.

14. The method according to claim 1, wherein the coloring pigment contained in the second nonaqueous ink is at least one selected from the group consisting of azo pigments, phthalocyanine pigments, polycyclic pigments, dyeing lake pigments, carbon black and titanium oxide.

15. The method according to claim 1, wherein the inorganic particles are at least one selected from the group consisting of talc, diatomaceous earth, calcium carbonate, barium carbonate, barium sulfate, alumina white, silica, kaolin, mica, acid clay, activated clay and bentonite.

* * * * *